United States Patent
Mutsuda et al.

(10) Patent No.: US 12,012,534 B2
(45) Date of Patent: Jun. 18, 2024

(54) CURABLE RESIN COMPOSITION, USE THEREOF, AND PRODUCTION METHOD THEREOF

(71) Applicant: Daicel-Evonik Ltd., Tokyo (JP)

(72) Inventors: Mitsuteru Mutsuda, Tokyo (JP); Hirofumi Iguchi, Tokyo (JP); Toshiaki Nakamura, Tokyo (JP)

(73) Assignee: DAICEL-EVONIK LTD., Tokyo (JP)

(*) Notice: Subject to any disclaimer, the term of this patent is extended or adjusted under 35 U.S.C. 154(b) by 272 days.

(21) Appl. No.: 17/127,356

(22) Filed: Dec. 18, 2020

(65) Prior Publication Data

US 2021/0222031 A1 Jul. 22, 2021

(30) Foreign Application Priority Data

Jan. 17, 2020 (JP) .................................. 2020-006351

(51) Int. Cl.
*C09J 7/38* (2018.01)
*C08L 77/06* (2006.01)
*C09J 7/28* (2018.01)

(52) U.S. Cl.
CPC ................. *C09J 7/38* (2018.01); *C08L 77/06* (2013.01); *C09J 7/28* (2018.01); *C09J 2477/00* (2013.01)

(58) Field of Classification Search
CPC ... C09J 7/38; C09J 7/28; C09J 2477/00; C09J 177/02; C09J 177/06; C09J 2301/312; C09J 2463/00; C09J 7/30; C09J 11/06; C09J 177/00; C08L 77/06; C08L 77/02; C08L 2205/025; C08L 2205/03; B32B 7/12; B32B 15/088; B32B 27/34; B32B 37/12; B32B 2307/306
USPC ........................................................ 428/458
See application file for complete search history.

(56) References Cited

U.S. PATENT DOCUMENTS

| | | | | |
|---|---|---|---|---|
| 4,101,534 A | * | 7/1978 | Ueno | C09J 177/06 156/330.9 |
| 2007/0163709 A1 | * | 7/2007 | Risthaus | B32B 15/08 428/458 |
| 2015/0282566 A1 | * | 10/2015 | Gruhn | B29D 35/142 264/261 |
| 2020/0339810 A1 | * | 10/2020 | Fillot | C08L 77/02 |
| 2021/0198541 A1 | * | 7/2021 | Mutsuda | C09J 175/12 |

FOREIGN PATENT DOCUMENTS

| | | |
|---|---|---|
| JP | 9-227827 A | 9/1997 |
| JP | 2007-190917 A | 8/2007 |
| WO | WO-2020044995 A1 * 3/2020 ............ B32B 15/06 |

OTHER PUBLICATIONS

Huntsman, "Araldite (R) GT7071#", Sep. 2012, p. 1 (Year: 2012).*
Office Action issued Jan. 26, 2021, in Japanese Patent Application No. 2020-006351.

* cited by examiner

*Primary Examiner* — Callie E Shosho
*Assistant Examiner* — Steven A Rice
(74) *Attorney, Agent, or Firm* — Birch, Stewart, Kolasch & Birch, LLP

(57) ABSTRACT

[Object]
The present invention provides a curable resin composition useful for imparting high durability and adhesion to a substrate such as a metal.
[Solution]
A curable resin composition is prepared by combining a polyamide-based resin (A) having an amino group, a blocked polyisocyanate (B), and an epoxy compound (C). The polyamide-based resin (A) contains a polyamide-based resin (A1) having a melting point of 170° C. or higher and a polyamide-based resin (A2) having a melting point of 150° C. or lower. The mass ratio of the polyamide-based resin (A1) and the polyamide-based resin (A2) is, in the form of the former/the latter, from 65/35 to 35/65.

12 Claims, No Drawings

CURABLE RESIN COMPOSITION, USE THEREOF, AND PRODUCTION METHOD THEREOF

TECHNICAL FIELD

The present disclosure relates to a curable resin composition useful for imparting high durability and adhesion to a substrate such as a metal, a composite component in which a surface of the substrate is covered with a cured film of the curable resin composition, a composite molded component in which a resin layer is formed on the cured film, and production methods thereof.

BACKGROUND ART

People have been using a flow immersion method, an electrostatic coating method, or the like to form a coating layer for the purpose of improving the corrosion resistance and durability of metal. In particular, in applications where high durability is required, such as structural components of means of transportation such as vehicles (automobiles, etc.) and airplanes, hybrid components have been produced by priming a metal, molding a resin on a primer layer (adhesive layer), and causing hybridization to occur.

JP 2007-190917 A (Patent Document 1) and its corresponding US 2011/0143142 A1 describe a method of producing a hybrid component formed from a metal and a polymer, wherein a metal is bonded to a polymer with a copolyamide-based hotmelt adhesive further containing isocyanate and epoxide, the hotmelt adhesive containing a copolyamide based on laurinlactam, from 2.5% to 15% of blocked isocyanate, and 2.5% to 10% of epoxide. According to the document, the hotmelt adhesive includes Degussa's VESTAMELT X1038-P1 [60% laurinlactam, 25% caprolactam, and 15% AH salt (mixture of 50% adipic acid and 50% hexamethylenediamine)] (95%), VESTAGON BF1540-P1 (5%), and Araldite GT7004 (5%), and a polymer structure is formed by means of injection molding in the final step.

CITATION LIST

Patent Document

Patent Document 1: JP 2007-190917 A

SUMMARY OF INVENTION

Technical Problem

When an adhesive according to Patent Document 1 is electrostatically coated and heated, an adhesive layer with high adhesion to metal can be formed, and by molding a thermoplastic resin on the adhesive layer by means of injection molding, a hybrid component with high durability can be produced. However, for unknown reasons, when the hybrid component formed in this manner is immersed in hot water, the adhesion may decrease. In addition, when thermoplastic resin is molded on the adhesive layer by means of injection molding, a void may be generated at the interface between the metal and the adhesive layer. As a result, high corrosion resistance and durability cannot be maintained over an extended period of time.

Therefore, an object of the present invention is to provide a curable resin composition useful for imparting high durability and adhesion to a substrate such as a metal, a composite component in which a surface of the substrate is coated with a coating layer (adhesive layer or cured film) of the curable resin composition, a composite molded component in which a resin is molded on the adhesive layer, and production methods thereof.

Another object of the present invention is to provide a curable resin composition useful for forming an adhesive layer (or cured film) having high adhesion to a substrate such as a metal and having excellent heat resistance, a composite component using the resin composition (composite component primed with the curable resin composition), a composite molded component, and production methods thereof.

Yet another object of the present invention is to provide a curable resin composition suitable for obtaining a composite molded component having high adhesion and heat resistance even when a polyamide resin is molded on an adhesive layer (or cured film) at a temperature of 260° C. or lower.

Solution to Problem

As a result of diligent research to accomplish the objects mentioned above, the present inventors discovered that by combining a poly amide-based resin (A) having an amino group, a blocked polyisocyanate (B), and an epoxy compound (C), in which the polyamide-based resin (A) is a combination of a polyamide-based resin (A1) having a melting point of 170° C. or higher and a polyamide-based resin (A2) having a melting point of 150° C. or lower in a specific ratio, high durability and adhesion to a substrate such as a metal can be imparted, and thus the present invention was completed.

That is, the curable resin composition of the present disclosure is a resin composition containing a poly amide-based resin (A) having an amino group, a blocked polyisocyanate (B), and an epoxy compound (C), wherein the polyamide-based resin (A) contains a polyamide-based resin (A1) having a melting point of 170° C. or higher and a polyamide-based resin (A2) having a melting point of 150° C. or lower, a mass ratio of the poly amide-based resin (A1) to the polyamide-based resin (A2), in the form of the former/the latter, being from 65/35 to 35/65. The polyamide-based resin (A) may be particulate. The curable resin composition may be a particulate mixture. The mass ratio of the polyamide-based resin (A1) to the polyamide-based resin (A2) may be, in the form of the former/the latter, from 60/40 to 40/60. The amino group concentration of either the polyamide-based resin (A1) or the polyamide-based resin (A2) may be 80 mmol/kg or greater. The blocked polyisocyanate (B) may have a glass transition temperature from 60 to 110° C., a melting point from 70 to 130° C., and a dissociation temperature from 120 to 200° C. The epoxy compound (C) may contain a bisphenol-type epoxy resin having a softening temperature of 75° C. or higher. The ratio of the isocyanate group of the blocked polyisocyanate (B) per 1 mol of the amino group of the polyamide-based resin (A) may be from 1.5 to 5 mol, while the ratio of the epoxy group of the epoxy compound (C) per 1 mol of the amino group of the poly amide-based resin (A) may be from 0.1 to 0.8 mol. The isocyanate group of the blocked polyisocyanate (B) may be in excess from 15 to 450 mmol/kg with respect to the amino group of the polyamide-based resin (A). The concentration of the epoxy group may be from 3 to 35 mol % with respect to the total number of moles of the amino group, isocyanate group, and epoxy group. The total number of moles of the isocyanate group of the blocked polyisocyanate (B) may be from 1.3 to 50 times the total number of moles of the amino group of the polyamide-based resin (A).

The blocked polyisocyanate (B) may be contained in a ratio from 5 to 30 parts by mass per 100 parts by mass of the polyamide-based resin (A), while the epoxy compound (C) may be contained in a ratio from 5 to 30 parts by mass per 100 parts by mass of the polyamide-based resin (A).

The present disclosure also includes a composite component in which an adhesive layer of the curable resin composition is formed on a surface of a substrate. Furthermore, the present disclosure also includes a method of producing a composite component which includes coating a surface of a substrate with the curable resin composition and forming an adhesive layer.

The present disclosure also includes a composite molded component in which a composition containing at least a thermoplastic resin is molded or laminated on the adhesive layer of the composite component. The substrate may be a metal substrate. The thermoplastic resin may contain a polyamide-based resin having a melting point higher than that of the polyamide-based resin (A). Furthermore, the present disclosure also includes a method of producing a composite molded component which includes molding or laminating a composition containing at least a thermoplastic resin on the adhesive layer of the composite component.

Note that, in the present specification and claims, an epoxy compound, including an epoxy resin, may be simply referred to as "epoxy compound", and the protected isocyanate group of the blocked polyisocyanate may be simply referred to as "isocyanate group". In addition, an epoxy group, including a glycidyl group, may be simply referred to as "epoxy group".

Also, each aspect disclosed in the present specification can be combined with any other feature disclosed herein.

Advantageous Effects of Invention

In the present disclosure, a polyamide-based resin (A) having an amino group, a blocked polyisocyanate (B), and an epoxy compound (C) are combined, in which the polyamide-based resin (A) is a combination of a polyamide-based resin (A1) having a melting point of 170° C. or higher and a polyamide-based resin (A2) having a melting point of 150° C. or lower in a specific ratio. Hence, a composite component coated with an adhesive layer (or cured film) having high durability and adhesion to a substrate of a metal or the like can be produced, and a composite molded component can be produced by molding or laminating a thermoplastic resin on the adhesive layer. Furthermore, the composite component that has been primed with a curable resin composition to form an adhesive layer (or reactive adhesive layer) is highly adhesive with respect to a substrate such as a metal, and the heat resistance of the composite component can also be improved. Therefore, even when the polyamide resin is molded or laminated on the adhesive layer (or cured film) at a temperature of 280° C. or lower, a uniform and highly durable composite molded component can be obtained without a void being generated at the interface between the substrate such as a metal and the adhesive layer.

DESCRIPTION OF EMBODIMENTS

Polyamide-Based Resin (A) Having Amino Group

The polyamide-based resin (A) has an amino group and, by having the amino group, the adhesion of the adhesive layer formed from the curable resin composition can be improved.

The polyamide-based resin (A) contains a polyamide resin (including homo- or copolyamide resin) and a polyamide elastomer (polyamide block copolymer), and can be formed from any one of amide-forming components (a) to (c) below.

(a) A first amide-forming component which is a combination of an alkylene diamine component and an alkane dicarboxylic acid component;

(b) A second amide-forming component composed of at least one of a lactam component and an aminocarboxylic acid component;

(c) A first amide-forming component and a second amide-forming component.

That is, the polyamide resin can be formed from any one of the amide-forming components (a) to (c) (a first amide-forming component; a second amide-forming component; a combination of a first amide-forming component and a second amide-forming component), while the polyamide elastomer can be prepared using a polyamide formed from any one of the amide-forming components (a) to (c). Note that a lactam component and an aminocarboxylic acid component having the same number of carbons and branched chain structure can be considered equivalent components to each other.

The polyamide resin may be an alicyclic polyamide, but is usually an aliphatic polyamide in many cases. Further, the polyamide resin may be a homopolyamide resin or a copolyamide resin (copolymerized polyamide resin). Note that the copolyamide resin may be, for example: a copolyamide resin formed from a first amide-forming component having a different number of carbons; a copolyamide resin of the first amide-forming component and the second amide-forming component; or a copolyamide resin formed from a second amide-forming component having a different number of carbons. Note that a copolyamide resin formed from a first amide-forming component and/or a second amide-forming component having a different number of carbons may be referred to as a first copolyamide resin, while a copolyamide resin of a first amide-forming component and/or a second amide-forming component and a copolymerization component (alicyclic or aromatic component) may be referred to as a second copolyamide resin.

Examples of the alkylene diamine component include a $C_{4-18}$ alkylene diamine, such as tetramethylene diamine, hexanemethylene diamine, octamethylene diamine, decane diamine, dodecane diamine, tetradecane diamine, and octadecane diamine. These diamine components can be used alone or in a combination of two or more. Preferred diamine components include at least a $C_{8-18}$ alkylene diamine, preferably a $C_{10-16}$ alkylene diamine, more preferably a $C_{11-16}$ alkylene diamine, and particularly a $C_{11-14}$ alkylene diamine such as dodecane diamine.

Examples of the alkane dicarboxylic acid component include a $C_{4-36}$ alkane dicarboxylic acid, such as adipic acid, suberic acid, azelaic acid, sebacic acid, dodecanedioic acid, and octadecanedioic acid. These dicarboxylic acid components can be used alone or in a combination of two or more. Preferred dicarboxylic acid components include a $C_{8-18}$ alkane dicarboxylic acid, for example, a $C_{10-16}$ alkane dicarboxylic acid, preferably a $C_{12-14}$ alkane dicarboxylic acid.

In the first amide-forming component, the diamine component can be used in a range of approximately from 0.8 to 1.2 mol, preferably approximately from 0.9 to 1.1 mol, per 1 mol of the dicarboxylic acid component.

Examples of the lactam component include a $C_{4-20}$ lactam, such as ε-caprolactam, ω-octanelactam, ω-nonanelactam, ω-decanelactam, ω-undecanelactam, ω-laurolactam (or ω-laurinlactam or dodecanelactam), and ω-tridecanelactam.

Examples of the aminocarboxylic acid component include a $C_{4-20}$ aminocarboxylic acid, such as ω-aminodecanoic acid, ω-aminoundecanoic acid, ω-aminododecanoic acid, and ω-aminotridecanoic acid. These lactam components and aminocarboxylic acid components can also be used alone or in a combination of two or more.

Preferred lactam components are, for example, a $C_{8-18}$ lactam, preferably a $C_{10-16}$ lactam such as a $C_{10-15}$ lactam, more preferably a $C_{10-14}$ lactam such as a $C_{11-13}$ lactam. Preferred aminocarboxylic acids have the same numbers of carbons as the above preferred lactam components. In particular, the lactam component and/or the aminocarboxylic acid often contains at least a $C_{11-12}$ lactam component and/or aminocarboxylic acid (such as undecanelactam, laurolactam or laurinlactam, aminoundecanoic acid, and aminododecanoic acid), for example, a lactam component and/or aminocarboxylic acid having 12 carbons.

The ratio (molar ratio) of the first amide-forming component to the second amide-forming component can be selected from a range of, in the form of the former/the latter, approximately from 100/0 to 0/100, for example, approximately from 90/10 to 0/100 such as from 80/20 to 5/95, preferably approximately from 75/25 to 10/90 such as from 70/30 to 15/85, more preferably approximately from 60/40 to 20/80.

Preferred polyamide resins contain a component having at least a $C_{8-18}$ alkylene chain (or a linear alkylene chain), for example, a $C_{8-16}$ alkylene chain such as a $C_{9-15}$ alkylene chain, preferably a $C_{10-14}$ alkylene chain such as a $C_{11-14}$ alkylene chain, and more preferably a $C_{11-13}$ alkylene chain such as a $C_{11-12}$ alkylene chain, as the first and/or second amide-forming component.

The polyamide resin formed from such a component has high heat resistance and excellent adhesion to a substrate such as a metal, and is useful for forming a uniform and strong adhesive layer (primer layer or reactive adhesive layer) on a surface of the substrate.

Note that, the polyamide resin using the component having a $C_{8-18}$ alkylene chain as the first and/or second amide-forming component may be a homopolyamide resin (a homopolyamide resin of a component containing an alkylene chain having a specific number of carbons) or a first copolyamide resin (a copolymer of a plurality of components containing the $C_{8-18}$ alkylene chain at different numbers of carbons; or a first copolyamide resin of a component having the $C_{8-18}$ alkylene chain (or a linear alkylene chain) and a first and/or second amide-forming component having a short chain).

Note that examples of the first amide-forming component having a short chain include: an alkylene diamine in which the number of carbons of the main chain is $C_{4-7}$, such as tetramethylenediamine, hexamethylenediamine, and trimethylhexamethylenediamine; a $C_{6-7}$ alkanedicarboxylic acid such as adipic acid and pimelic acid. Meanwhile, examples of the second amide-forming component having a short chain include: a $C_{4-7}$ lactam such as δ-valerolactam, ε-caprolactam, and ω-heptalactam, and a $C_{4-7}$ aminocarboxylic acid. The first and second amide-forming components having a short chain may be used in a small amount relative to the total amount of the first and the second amide-forming components, for example, approximately from 0 to 50 mol %, preferably from 0 to 40 mol %, and more preferably from 0 to 30 mol %.

Furthermore, the copolyamide resin may be, if necessary, a copolymer (second copolyamide resin) of a copolymerization component that is copolymerizable with the first and/or second amide-forming components. The diamine component used as the copolymerization component may be an alicyclic diamine component or an aromatic diamine component such as metaxylylene diamine. Examples of the alicyclic diamine component include: a diamino $C_{5-10}$ cycloalkane such as diaminocyclohexane; a bis(amino $C_{5-8}$ cycloalkyl) $C_{1-3}$ alkane such as bis(4-aminocyclohexyl)methane, bis(4-amino-3-methylcyclohexyl)methane, and 2,2-bis(4-aminocyclohexyl)propane; and a hydrogenated xylylenediamine. In addition, the dicarboxylic acid component as the copolymerization component may be an alicyclic dicarboxylic acid component, for example, a $C_{5-10}$ cycloalkane-dicarboxylic acid such as cyclohexane-1,4-dicarboxylic acid and cyclohexane-1,3-dicarboxylic acid, or may be an aromatic dicarboxylic acid such as terephthalic acid and isophthalic acid. Note that an alicyclic diamine component and/or an alicyclic dicarboxylic acid component may be used as the copolymerization component to be copolymerized with the first and/or second amide-forming components to form an alicyclic polyamide resin such as a transparent polyamide.

In the polyamide resin, the ratio of the first and second amide-forming components with respect to all the components may be approximately from 60 to 100 mol % such as from 70 to 100 mol %, preferably approximately from 80 to 100 mol % such as from 85 to 97 mol %, and more preferably approximately from 90 to 100 mol %.

Note that the polyamide resin may be a modified polyamide such as a polyamide having a branched chain structure introduced by using a small amount of a polycarboxylic acid component and/or a polyamine component.

Examples of such a polyamide resin include: a homopolyamide resin such as polyamide 8, polyamide 9, polyamide 10, polyamide 11, polyamide 12, polyamide 13, polyamide 610, polyamide 611, polyamide 612, polyamide 911, polyamide 912, polyamide 1010, and polyamide 1012; and a copolyamide such as polyamide 6/10, polyamide 6/11, polyamide 6/12, polyamide 6/66/12, polyamide 6/12/612, polyamide 10/12, polyamide 11/12, polyamide 12/13, polyamide 12/18, and polyamide 14/18. These polyamide resins can be used alone or in a combination of two or more. Note that in the polyamide resin, the components separated by the mark "/" refer to the first amide-forming component or the second amide-forming component, not an alkylene diamine component or an alkane dicarboxylic acid component in the first amide-forming component.

Examples of the polyamide elastomer (polyamide block copolymer) include a polyamide block copolymer formed from a polyamide segment (polyamide segment corresponding to the polyamide resins mentioned above, for example, polyamide 11 or polyamide 12) as a hard segment (or hard block) and a soft segment (or soft block). The soft segment can be formed from, for example, a polyether, a polyester, or a polycarbonate. A typical polyamide elastomer is a polyamide-polyether block copolymer such as a polyether amide, for example, a block copolymer of a dicarboxyl-terminated polyamide block and a diol-terminated poly $C_{2-6}$ alkylene glycol block (or polyoxyalkylene block). Note that the polyamide elastomer may have an ester bond.

In the polyamide elastomer, the number average molecular weight (in terms of polystyrene) of the soft segment, when measured by gel permeation chromatography (GPC), may be selected from a range of approximately from 100 to 10000, and may be approximately from 300 to 5000 such as from 500 to 5000, preferably approximately from 1000 to 2000. The ratio (mass ratio) of the polyamide block (polyamide segment) to the soft segment (or block) may be, for example, in the form of the former/the latter, approximately from 75/25 to 10/90, preferably approximately from 70/30 to 15/85.

Among these polyamide-based resins, the polyamide resins mentioned above are preferred.

The polyamide-based resin (A) is selected from the polyamide resins mentioned above, and contains a combination of a polyamide-based resin (A1) having a melting point of 170° C. or higher and a polyamide-based resin (A2) having a melting point of 150° C. or lower.

The melting point of the polyamide-based resin (A1) can be any as long as it is 170° C. or higher, and may be, for example, approximately from 170 to 220° C., or may be approximately from 175 to 210° C., preferably from 175 to 200° C., more preferably approximately from 175 to 190° C., and particularly preferably approximately from 175 to 185° C.

Note that, in the present specification and claims, the melting point can be measured by a differential scanning calorimeter (DSC), and when a plurality of peaks are shown by a DSC, the melting point refers to the temperature corresponding to the highest peak on the high temperature side of the plurality of peaks.

The polyamide-based resin (A1) having such a melting point may be a homopolyamide resin or copolyamide resin of the polyamide resins mentioned above, in which the ratio of the component having a $C_{8-16}$ alkylene chain (preferably a $C_{10-14}$ alkylene chain, more preferably a $C_{11-13}$ alkylene chain) with respect to the total amount of the components forming the polyamide-based resin (monomers) (or the first and second amide-forming components) is approximately from 65 to 100 mol % such as from 65 to 98 mol %, preferably approximately from 70 to 100 mol % such as from 75 to 98 mol %, more preferably approximately from 80 to 100 mol % such as from 85 to 100 mol %, and particularly approximately from 90 to 100 mol % such as from 95 to 100 mol %. A particularly preferred polyamide-based resin (A1) is a homo- or copolyamide resin, particularly a homopolyamide resin, containing at least one selected from a $C_{11-13}$ lactam and/or a $C_{11-13}$ aminocarboxylic acid, for example, laurolactam, aminoundecanoic acid, or aminododecanoic acid, as an amide-forming component. Specific examples of the polyamide-based resin (A1) include polyamide 610, polyamide 612, polyamide 1010, polyamide 1012, polyamide 10, polyamide 11, and polyamide 12, of which polyamide 11 and polyamide 12 such as a homopolymer of lauryl lactam are widely used.

The polyamide-based resin (A1) preferably has a low water absorption or hygroscopicity. That is, the water absorption of the polyamide-based resin (A1) may be approximately 1 mass % or less such as from 0.01 to 0.8 mass %, preferably approximately 0.75 mass % or less such as from 0.05 to 0.65 mass %, more preferably approximately 0.65 mass % or less such as from 0.1 to 0.55 mass %, and particularly approximately 0.5 mass % or less such as from 0.1 to 0.4 mass %, or may be approximately from 0.1 to 0.65 mass %, preferably approximately from 0.12 to 0.55 mass %, more preferably approximately from 0.15 to 0.45 mass %, and particularly approximately from 0.3 mass % or less such as from 0.15 to 0.25 mass %.

Note that, in the present specification and claims, the measurement of water absorption is based on the water absorption test specified in ASTM D570. The water absorption can be obtained by cooling a dried sample in a desiccator, measuring the mass of the sample, immersing the sample in water at 23° C. for 24 hours, patting the sample dry with a piece of cloth and wiping off excess moisture, measuring the mass of the sample, and calculating the mass change (rate of increase) of the sample piece. A sample having a thickness of 0.125 inches (approximately 0.32 cm) can be used.

The equilibrium moisture content of the polyamide-based resin (A1) may be, when measured according to ISO 62 at a relative humidity of 50% RH and a room temperature of 23° C., for example, approximately 2 mass % or less such as from 0.1 to 1.8 mass %, preferably approximately 1.5 or less such as from 0.3 to 1.5 mass %, more preferably approximately 1.3 mass % or less such as from 0.4 to 1.3 mass %, and particularly approximately 1 mass % or less such as from 0.5 to 0.9 mass %, or may be approximately from 0.5 to 0.85 mass % such as from 0.6 to 0.8 mass %.

The saturated moisture content of the polyamide-based resin (A1), when measured according to the ISO 62 method A after being immersed in water at 23° C. for 1 week, may be approximately 5 mass % or less such as from 0.5 to 4.5 mass %, preferably approximately from 0.5 to 4 mass % such as from 0.6 to 3.8 mass %, more preferably approximately from 0.8 to 3.5 mass % such as from 1 to 3 mass %, and particularly approximately from 1.1 to 2.8 mass % such as from 1.2 to 2.7 mass %.

The average concentration of amide bonds per repeating unit of the polyamide-based resin (A1) is preferably low. The average concentration of amide bonds may be, for example, approximately from 1 to 10 mol/kg such as from 2 to 9 mol/kg, preferably approximately from 3 to 8 mol/kg such as from 4 to 7 mol/kg, and more preferably approximately from 5 to 7 mol/kg.

The polyamide-based resin (A1) has an amino group (in particular, a terminal amino group) in order to increase the adhesion of the adhesive layer to a substrate such as a metal. The amino group concentration $C_{NH2}$ (unit: mmol/kg) of the polyamide-based resin (A1) can be selected from a range of approximately from 5 to 300, but is preferably 80 or greater, and may be, for example, approximately from 80 to 250, preferably approximately from 90 to 200, more preferably approximately from 100 to 170, even more preferably approximately from 100 to 160, and particularly approximately from 125 to 150. When the amino group concentration of the polyamide-based resin (A1) is high, the adhesion of the adhesive layer formed from the curable resin composition can be greatly improved.

The carboxyl group (terminal carboxyl group) concentration (unit: mmol/kg) of the polyamide-based resin (A1) is not particularly limited, and may be, for example, approximately 50 or less such as from 0 to 25, usually approximately 20 or less such as from 1 to 15, preferably approximately 10 or less such as from 1.5 to 7, and more preferably approximately from 2 to 5.

In the polyamide-based resin (A1), the ratio of the amino group to the carboxyl group is not particularly limited, but the amino group concentration is preferably higher than the carboxyl group concentration. The ratio (molar ratio) of the amino group to the carboxyl group in the polyamide-based resin (A1) may be, for example, approximately from 60/40 to 100/0 such as from 70/30 to 99.9/0.1, preferably approximately from 80/20 to 100/0 such as from 85/15 to 99.5/0.5, and more preferably approximately from 90/10 to 99/1 such as from 95/5 to 98/2.

Note that, in the present specification and claims, the amino group concentration and the carboxyl group concentration can be measured by a commonly used method, for example, a titration method. For example, the amino group concentration can be measured by dissolving a sample of the polyamide resin in a mixed solvent of phenol and ethanol at a volume ratio of 10:1 to prepare a 1 wt. % solution, then performing neutralization titration with a 1/100 N HCl aqueous solution. Meanwhile, the carboxyl group concentration can be measured by dissolving a sample of the polyamide resin in benzyl alcohol to prepare a 1 wt. % benzyl alcohol solution, then performing neutralization titration with a 1/100 N KOH aqueous solution.

The number average molecular weight (unit: $\times 10^4$) of the polyamide-based resin (A1) can be selected from, for example, a range of approximately from 0.5 to 20 such as from 0.7 to 15, preferably approximately from 0.8 to 10 such as from 0.9 to 8, and more preferably approximately from 1 to 7 such as from 1 to 5.

Note that in the present specification and claims, the molecular weight can be measured in terms of polymethyl methacrylate by gel permeation chromatography using HFIP (hexafluoroisopropanol) as a solvent.

The melt flow rate (MFR, unit: g/10 min) of the polyamide-based resin (A1) may be, at a temperature of 230° C. and a load of 2.16 kg, approximately from 1 to 100 such as from 2 to 80, preferably approximately from 5 to 75 such as from 7 to 60, and more preferably approximately from 10 to 50 such as from 12 to 35.

Note that in the present specification and claims, the MFR can be measured according to ISO 1133 using a melt flow rate meter.

The polyamide-based resin (A1) is a solid at room temperature and is preferably particulate. The average particle size D50 of the particulate polyamide-based resin (A1) may be approximately 3 µm or greater, for example, approximately from 3 to 100 µm, preferably from 5 to 80 µm, more preferably approximately from 10 to 70 µm, and particularly approximately from 30 to 60 µm.

Note that in the present specification and claims, the average particle size D50 is expressed by number average primary particle size, and can be measured by a commonly used method, for example, one using a particle size distribution measurement device adopting a laser diffraction/scattering method.

The melting point of the polyamide-based resin (A2) may be any as long as it is 150° C. or lower, for example, approximately from 90 to 150° C., or approximately from 100 to 150° C., preferably approximately from 110 to 145° C., more preferably approximately from 110 to 140° C., and particularly approximately from 110 to 130° C.

The polyamide-based resin (A2) having such a melting point may be a copolyamide resin of, among the polyamide resins mentioned above, a combination of: a component having a $C_{4-7}$ alkylene chain, preferably a $C_{4-6}$ alkylene chain, more preferably a $C_{5-6}$ alkylene chain; and a component having a $C_{8-16}$ alkylene chain, preferably a $C_{10-14}$ alkylene chain, more preferably a $C_{11-13}$ alkylene chain. The ratio of the component having a $C_{4-7}$ alkylene chain may be, for example, from 30 to 75 mol %, preferably from 30 to 70 mol %, more preferably from 35 to 65 mol %, and particularly from 40 to 60 mol %, with respect to the total amount of the components forming the polyamide-based resin (monomers) (or the first and second amide-forming components). Specific examples of the polyamide-based resin (A2) include polyamide 6/10, polyamide 6/11, polyamide 6/12, polyamide 6/66/12, and polyamide 6/12/612.

The water absorption of the polyamide-based resin (A2) may be, approximately 5 mass % or less such as from 0.01 to 5 mass %, preferably approximately 3 mass % or less such as from 0.1 to 2.5 mass %, more preferably approximately 2.5 mass % or less such as from 0.5 to 2 mass %, and particularly approximately 2 mass % or less such as from 1 to 2 mass %.

The equilibrium moisture content of the polyamide-based resin (A2) may be, when a flat plate measured 100 mm×100 mm×2 mm molded by injection molding is immersed in water at 23° C. for 5 days, for example, approximately 3.5 mass % or less such as from 0.5 to 3.5 mass %, preferably approximately 3.0 mass % or less such as from 0.5 to 3.0 mass %, more preferably approximately 2.5 mass % or less such as from 0.5 to 2.5 mass %, and particularly approximately 2.0 mass % or less such as from 0.5 to 2.0 mass %.

The average concentration of amide bonds per repeating unit of the polyamide-based resin (A2) is preferably low. The average concentration of amide bonds may be, for example, approximately from 3 to 7 mol/kg such as from 3.5 to 7.0 mol/kg, preferably approximately from 4 to 7 mol/kg such as from 4.5 to 6.5 mol/kg, and more preferably approximately from 5.0 to 6.5 mol/kg.

The polyamide-based resin (A2) has an amino group (in particular, a terminal amino group) in order to increase the adhesion of the adhesive layer to a substrate such as a metal. The amino group concentration $C_{NH2}$ (unit: mmol/kg) of the polyamide-based resin (A2) can be selected from a range of approximately from 5 to 300, but is preferably 80 or greater, and may be, for example, approximately from 80 to 260, preferably approximately from 90 to 250, more preferably approximately from 100 to 230, even more preferably approximately from 120 to 220, and particularly approximately from 150 to 200. When the amino group concentration of the polyamide-based resin (A2) is high, the adhesion of the adhesive layer formed from the curable resin composition can be greatly improved.

The carboxyl group (terminal carboxyl group) concentration (unit: mmol/kg) of the polyamide-based resin (A2) is not particularly limited, and may be, for example, approximately 50 or less such as from 0 to 20, usually approximately 10 or less such as from 0.5 to 10, preferably approximately 5 or less such as from 0.8 to 3, and more preferably approximately from 1 to 2.

In the polyamide-based resin (A2), the ratio of the amino group to the carboxyl group is not particularly limited, but the amino group concentration is preferably higher than the carboxyl group concentration. The ratio (molar ratio) of the amino group to the carboxyl group in the polyamide-based resin (A2) may be, for example, approximately from 60/40 to 100/0 such as from 70/30 to 99.95/0.05, preferably approximately from 80/20 to 100/0 such as from 90/10 to 99.9/0.1, and more preferably approximately from 95/5 to 99.7/0.3 such as from 99/1 to 99.5/0.5.

The number average molecular weight (unit: $\times 10^4$) of the polyamide-based resin (A2) can be calculated based on the amount of terminal groups measured using a titration method, and can be selected from, for example, a range of approximately from 0.5 to 3.0 such as from 0.5 to 2.8, preferably approximately from 0.5 to 2.5 such as from 0.6 to 2.3, and more preferably approximately from 0.6 to 1.5 such as from 0.6 to 1.1.

The polyamide-based resin (A2) is a solid at room temperature and is preferably particulate. The average particle size D50 of the particulate polyamide-based resin (A2) may be approximately 3 µm or greater, for example, approximately from 3 to 100 µm, preferably from 5 to 80 µm, more preferably approximately from 10 to 70 µm, and particularly approximately from 30 to 60 µm.

The mass ratio of the polyamide-based resin (A1) to the polyamide-based resin (A2) may be, in the form of the former/the latter, approximately from 65/35 to 35/65, preferably approximately from 60/40 to 40/60, more preferably approximately from 55/45 to 40/60, even more preferably approximately from 50/50 to 40/60, and particularly approximately from 50/50 to 45/55. In the present disclosure, by combining the polyamide-based resin (A1) and the polyamide-based resin (A2) at such a ratio, both adhesion and heat resistance of the curable resin composition can be achieved in a compatible manner.

The total ratio of the polyamide-based resin (A1) and the polyamide-based resin (A2) in the polyamide-based resin (A) may be 50 mass % or greater, preferably 70 mass % or greater, more preferably 80 mass % or greater, even more preferably 90 mass % or greater. The total ratio may be taken up entirely by the polyamide-based resin (A1) and the polyamide-based resin (A2) (100 mass %). If the total ratio of the polyamide-based resin (A1) and the polyamide-based resin (A2) is too small, there is a risk that the adhesion of the curable resin composition may not be improved.

The polyamide-based resin (A) may optionally contain various additives, for example: a stabilizer, such as a heat-resistant stabilizer, a weather-resistant stabilizer, an antioxidant, or a UV absorber; a colorant; a filler; a plasticizer; a lubricant; a flame retardant; an antistatic agent; or a silane coupling agent. Additives can be used alone or in a combination of two or more. The ratio of the additive may be 10 mass % or less, such as approximately from 0.01 to 10 mass %, in the polyamide-based resin (A).

Blocked polyisocyanate (B) The polyisocyanate of the blocked polyisocyanate (B) may be any one of an aromatic polyisocyanate, an alicyclic polyisocyanate, an aliphatic polyisocyanate, or a heterocyclic polyisocyanate. Examples of the aromatic polyisocyanate include a diisocyanate such as tolylene diisocyanate (TDI), xylylene diisocyanate (XDI), tetramethylxylylene diisocyanate (TMXDI), naphthalene diisocyanate (NDI), bis(isocyanatophenyl)methane (MDI), 1,3-bis(isocyanatophenyl)propane, bis(isocyanatophenyl)ether, bis(isocyanatophenyl)sulfone, and tolidine diisocyanate (TODI). Examples of the alicyclic polyisocyanate include: a diisocyanate such as cyclohexane-1,4-diisocyanate, isophorone diisocyanate (IPDI), hydrogenated xylylene diisocyanate, and hydrogenated bis(isocyanatophenyl)methane; and a triisocyanate such as bicycloheptane triisocyanate. Examples of the aliphatic polyisocyanate include: a $C_{2-12}$ alkane diisocyanate such as propylene diisocyanate, trimethylene diisocyanate, tetramethylene diisocyanate, hexamethylene diisocyanate (HDI), trimethylhexamethylene diisocyanate (TMDI), and lysine diisocyanate (LDI); an alkane triisocyanate such as 1,3,6-hexamethylene triisocyanate and 1,6,11-undecane triisocyanate methyloctane.

These polyisocyanates may be derivatives thereof, for example: multimers such as dimers, trimers (polyisocyanates having an isocyanurate ring), and tetramers; adducts; modified products such as biuret-modified products, allophanate-modified products, and urea-modified products; and urethane oligomers. Specifically, derivatives of the polyisocyanate include: an adduct of polyisocyanate (an alkane polyisocyanate such as hexamethylene diisocyanate) and a polyhydric alcohol (such as trimethylolpropane and pentaerythritol), a biuret of the polyisocyanate mentioned above, an isocyanurate having the isocyanurate ring (isocyanuric acid ester backbone) (for example, a polyisocyanate having an isocyanurate ring which is a trimer of hexamethylene diisocyanate), and a polyisocyanate having a uretdione backbone.

Of these polyisocyanates, an aliphatic polyisocyanate, an aromatic polyisocyanate (such as TDI and MDI) or a derivative thereof (such as HDI or a trimer thereof) is often used.

Examples of the blocking agent (protective agent) of the blocked polyisocyanate (B) include: an alcohol such as isopropanol and 2-ethylhexanol; a phenol such as phenol, cresol, xylenol, and resorcin; an oxime such as acetoxime, methyl ethyl ketoxime, and cyclohexaneoxime; a lactam such as ε-caprolactam; and an active methylene compound such as ethyl acetoacetate. These blocking agents can be used alone or in a combination of two or more. These blocking agents can be selected according to the type of the polyisocyanate, the dissociation temperature, and the like, and a phenol, an oxime, ε-caprolactam, or an active methylene compound is often used.

The content of the isocyanate group (blocked isocyanate group) of the blocked polyisocyanate (B) may be, for example, approximately from 5 to 30 mass % such as from 7.5 to 25 mass %, and preferably approximately from 10 to 20 mass % such as from 12.5 to 17.5 mass %, or may be approximately from 13 to 20 mass % such as from 14 to 18 mass %, preferably from 15 to 17 mass %.

The isocyanate equivalent weight (unit: g/eq.) of the blocked polyisocyanate (B) may be, for example, approximately from 150 to 350, preferably approximately from 175 to 300, and more preferably approximately from 200 to 280 such as from 230 to 275.

In the blocked polyisocyanate (B), the concentration of the isocyanate group (blocked isocyanate group) $C_{NCO}$ (unit: mmol/kg) may be, for example, approximately from 500 to 5500 such as from 750 to 5250, preferably approximately from 1000 to 5000 such as from 1500 to 4500, more preferably approximately from 2000 to 4500 such as from 2500 to 4000, or may be approximately from 3000 to 4000.

The blocked polyisocyanate (B) is usually a solid at room temperature, and the glass transition temperature of the blocked polyisocyanate (B) may be, for example, approximately from 50 to 120° C., preferably approximately from 60 to 110° C. such as from 65 to 95° C., and more preferably approximately from 70 to 100° C. such as from 75 to 85° C., and typically may be approximately from 65 to 100° C. such as from 70 to 90° C.

The melting point of the blocked polyisocyanate (B) may be, for example, approximately from 70 to 130° C., preferably approximately from 80 to 120° C., and even more preferably approximately from 90 to 115° C., or may be approximately from 80 to 125° C. such as from 95 to 115° C.

The dissociation temperature of the blocked polyisocyanate (B) (the temperature at which the blocking agent is desorbed and the isocyanate group is regenerated) may be, for example, approximately from 100 to 220° C. such as from 120 to 200° C., preferably approximately from 130 to 190° C. such as from 140 to 180° C., and more preferably approximately from 150 to 170° C. such as from 155 to 165° C. If the dissociation temperature is too low, the storage stability of the curable resin composition tends to decline. Meanwhile, if the dissociation temperature is too high, the coating film forming temperature or the baking temperature will increase, leading to decreased workability as well as the risk of decreased adhesiveness of the adhesive layer.

Note that a dissociation catalyst, for example, a tin compound such as dibutyltin laurate, a tertiary amine such as N-methylmorpholine, or a metal organic acid salt such as alkaline metal acetate and alkaline earth metal acetate may be added to adjust the dissociation temperature.

A blocked polyisocyanate is usually in the form of powder in many cases.

Epoxy Compound (C)

Examples of the epoxy compound (or epoxy resin) (C) include a glycidyl ether compound, a glycidyl ester compound, a glycidyl amine compound, a heterocyclic epoxy compound, and an alicyclic epoxy compound, and the epoxy compound (or epoxy resin) (C) has a plurality of glycidyl groups or oxirane rings. Examples of the glycidyl ether compound (glycidyl ether epoxy resin) include: a bisphenol-type epoxy resin, which is an epoxy resin based on a bisphenol such as bisphenol A, bisphenol F, bisphenol AD, bisphenol S, and bisphenol fluorene; a naphthol epoxy resin; a biphenyl epoxy resin; a triphenol methane epoxy resin; a novolac epoxy resin such as a phenol novolac epoxy resin and a cresol novolac epoxy resin; and a modified novolac epoxy resin.

Examples of the glycidyl ester compound (glycidyl ester epoxy resin) include polyvalent carboxylic acid glycidyl esters such as phthalate diglycidyl ester, tetrahydrophthalic acid, and hexahydrophthalic acid.

Examples of the glycidyl amine compound (glycidyl amine epoxy resin) include tetraglycidyl amino diphenyl methane and triglycidyl aminophenol.

Examples of the heterocyclic epoxy compound (heterocyclic epoxy resin) include triglycidyl isocyanurate (a triazine epoxy resin) and a hydantoin epoxy resin. Examples of the alicyclic epoxy compound (alicyclic epoxy resin) include epoxy resins in which cyclohexene rings are epoxidized.

These epoxy compounds can be used alone or in a combination of two or more. Preferred epoxy compounds are epoxy resins having a high softening point or melting point, for example, a glycidyl ether epoxy resin, a glycidyl amine epoxy resin, and an alicyclic epoxy resin, and in particular, a glycidyl ether epoxy resin based on a bisphenol such as bisphenol A (bisphenol-type epoxy resin). Furthermore, the epoxy compound may be a monomer, but preferably contains a multimer (for example, a multimer that is at least a trimer) such as a dimer, a trimer, a tetramer, a pentamer, and a decamer. Such a multimer often has a hydroxyl group with multimerization. The ratio of the multimer in gel permeation chromatography may be approximately from 45 to 99.9%, preferably approximately from 50 to 99%, and more preferably approximately from 55 to 98%.

The epoxy equivalent weight (unit: g/eq.) of the epoxy compound (C) can be selected from a range of approximately from 250 to 5000, for example, approximately from 300 to 3000 such as from 400 to 2500, preferably from 500 to 2000 such as from 600 to 1700, more preferably approximately from 650 to 1000 such as from 700 to 800, or may be approximately from 450 to 1500 such as from 500 to 1200, preferably approximately from 550 to 1000 such as from 600 to 900, and more preferably approximately from 650 to 800 such as from 700 to 770.

The epoxy group concentration $C_{EP}$ (unit: mmol/kg) of the epoxy compound (C) may be, for example, approximately from 100 to 1000 such as from 150 to 900, preferably approximately from 200 to 800 such as from 250 to 750, more preferably approximately from 300 to 700 such as from 350 to 650, or may be approximately from 400 to 600 such as from 450 to 570.

In addition, the hydroxyl group concentration (unit: mmol/kg) of the epoxy compound (or epoxy resin) (C) may be, for example, approximately from 500 to 5500 such as from 750 to 5250, preferably approximately from 1000 to 5000 such as from 1500 to 4500, more preferably approximately from 2000 to 4500 such as from 2500 to 4000, or may be approximately from 3000 to 4000 such as from 3300 to 3800.

The softening point or melting point of the epoxy compound (C) may be, for example, approximately 75° C. or higher such as from 75 to 125° C., preferably approximately 80° C. or higher such as from 80 to 115° C., and more preferably approximately 85° C. or higher such as from 90 to 110° C., or may be approximately from 95 to 105° C.

The epoxy compound (C) is usually a solid at room temperature and is often in the form of powder.

Since the epoxy compound (C) improves adhesion to a substrate such as a metal while having reactivity with the amino group of the poly amide-based resin (A), the adhesion to the substrate such as a metal is greatly improved. Furthermore, the epoxy compound of a multimer (including a dimer, a trimer, or the like) may have a hydroxyl group (secondary hydroxyl group). This hydroxyl group is involved in the adhesion to a substrate such as a metal while having reactivity with the blocked polyisocyanate (B), further improving the adhesion to the substrate.

Ratio of Each Component

In the present disclosure, the amino group (as well as the carboxyl group) of the polyamide-based resin (A), the isocyanate group of the blocked polyisocyanate (B), and the epoxy group (as well as the hydroxyl group) of the epoxy compound (C) react in a complicated manner and seem to adhere to a substrate such as a metal with high adhesion. For example, typically, it seems that the isocyanate group of the blocked polyisocyanate (B) reacts with the amino group of the polyamide-based resin (A) (as well as the hydroxyl group of the epoxy compound (C)), while the epoxy group of the epoxy compound (C) reacts with the amino group (as well as the carboxyl group) of the polyamide-based resin (A), forming an adhesive layer (cured film or primer layer) on the substrate. Therefore, the ratio of each component and the ratio of the reactive groups of each component also become complex.

The quantitative ratio of the polyamide-based resin (A) can be selected based on the concentration of the reactive groups of each component, and may be, for example, approximately from 50 to 95 mass % such as from 60 to 90 mass %, but is usually approximately from 65 to 90 mass % such as from 65 to 85 mass %, preferably approximately from 67 to 83 mass % such as from 70 to 80 mass %, or may be approximately from 70 to 90 mass % such as from 75 to 85 mass %, with respect to 100 mass % of the total amount of the polyamide-based resin (A), the blocked polyisocyanate (B), and the epoxy compound (C). When the ratio of the polyamide-based resin (A) is too small or too large, adhesion to the substrate tends to decrease.

It seems that the blocked polyisocyanate (B) reacts with the amino group of the polyamide-based resin (A) to greatly improve the mechanical strength and thermal properties of the adhesive layer, increasing adhesion to the substrate. Therefore, the quantitative ratio of the polyamide-based resin (A) and the blocked polyisocyanate (B) can be selected based on the concentration, reactivity, and the like of the functional groups (reactive groups) of each component. The ratio of the isocyanate group (blocked isocyanate group) of the blocked polyisocyanate (B) with respect to 1 mol concentration of the amino group of the polyamide-based resin (A) may be, for example, approximately from 0.5 to 7 mol such as from 0.7 to 6 mol, preferably approximately from 1 to 5 mol, but may typically be selected from a range of excess mole such as approximately from 1.1 to 5.5 mol, and may be, for example, approximately from 1.5 to 5 mol such as from 1.75 to 4.5 mol, preferably approximately from 2 to 4 mol such as from 2.25 to 3.75 mol, and more preferably approximately from 2.5 to 3.5 mol such as from 2.75 to 3.4 mol. When the ratio of the blocked polyisocyanate is too small, there is a risk that the adhesion to the substrate such as a metal and heat resistance will decrease. Meanwhile, when the ratio is too large, free polyisocyanate remains, which seems to deteriorate the properties of the adhesive layer. Furthermore, when an excessive amount of the blocked polyisocyanate (B) is used, reactivity with a molding resin (for example, a thermoplastic resin having a reactive group such as a hydroxyl group or an amino group, with examples being a polyester resin and a polyamide-based resin) of the composite molded component can also be increased, and adhesion to the molding resin can also be improved. This may be because the adhesive layer functions as an active primer layer (active intermediate layer) even when the adhesive layer is cured.

Specifically, the ratio of the isocyanate group (NCO) concentration $C_{NCO}$(mmol/kg) of the blocked polyisocyanate (B) to the amino group concentration $C_{NH2}$ (mmol/kg) of the polyamide-based resin (A) is not particularly limited, and the amino group concentration may be in excess, but usually the isocyanate group concentration is high. For example, the isocyanate group (NCO) concentration (mmol/kg) is often in excess relative to the amino group ($NH_2$) concentration (mmol/kg). The difference ($\Delta(C_{NCO}-C_{NH2})$) between the isocyanate group concentration ($C_{NCO}$) and the amino group concentration ($C_{NH2}$) may be, for example, approximately from 15 to 450 mmol/kg such as from 20 to 400 mmol/kg, preferably approximately from 30 to 300 mmol/kg such as from 35 to 250 mmol/kg, and more preferably approximately from 40 to 200 mmol/kg such as from 45 to 185 mmol/kg, or may be 20 mmol/kg or greater, preferably 30 mmol/kg or greater, and more preferably 40 mmol/kg or greater. The total number of moles of the isocyanate groups of the blocked polyisocyanate (B) relative to the total number of moles of the amino groups of the polyamide-based resin (A) may be, for example, approximately from 1.3 to 50 times such as from 1.5 to 40 times, preferably approximately from 2 to 35 times such as from 2.5 to 25 times, more preferably approximately from 2.7 to 15 times such as from 3 to 10 times, or may be approximately from 2.7 to 10 times such as from 3 to 8.5 times.

The ratio of the blocked polyisocyanate (B) per 100 parts by mass of the polyamide-based resin (A) may be approximately from 2.5 to 35 parts by mass, preferably approximately from 5 to 30 parts by mass such as from 7.5 to 25 parts by mass, and more preferably approximately from 10 to 20 parts by mass such as from 10 to 15 parts by mass.

The ratio of the epoxy group of the epoxy compound (C) with respect to 1 mol concentration of the amino group of the polyamide-based resin (A) may be, for example, approximately from 0.1 to 1 mol such as from 0.2 to 0.9 mol, preferably approximately from 0.2 to 0.8 mol such as from 0.25 to 0.7 mol, more preferably approximately from 0.3 to 0.6 mol such as from 0.35 to 0.55 mol, or may be approximately from 0.35 to 0.6 mol such as from 0.4 to 0.5 mol. Note that the ratio (mmol/kg) of the carboxyl group of the polyamide-based resin (A) to the epoxy group of the epoxy compound (C) may be, for example, in the form of the former/the latter, approximately from 0.01/1 to 0.5/1 such as from 0.02/1 to 0.4/1, preferably approximately from 0.03/1 to 0.3/1 such as from 0.04/1 to 0.2/1, and more preferably approximately from 0.05/1 to 0.2/1 such as from 0.06/1 to 0.15/1.

The ratio (mmol/kg) of the isocyanate group of the blocked polyisocyanate (B) to the hydroxyl group (secondary hydroxyl group) of the epoxy compound (C) may be, for example, in the form of the former/the latter, approximately from 0.5/1 to 1.5/1 such as from 0.7/1 to 1.3/1, and preferably approximately from 0.8/1 to 1.2/1 such as from 0.9/1 to 1.1/1.

Note that the mass ratio of the blocked polyisocyanate (B) to the epoxy compound (C) may be, in the form of the former/the latter, approximately from 20/80 to 80/20, preferably approximately from 30/70 to 70/30, and more preferably approximately from 40/60 to 60/40.

The epoxy group concentration $C_{EP}$ with respect to the total amount (total number of moles) (mmol/kg) of the amino group, the isocyanate group, and the epoxy group may be, for example, approximately from 2 to 40 mol % such as from 3 to 35 mol %, but usually may be approximately from 5 to 30 mol % such as from 5 to 25 mol %, preferably approximately from 7 to 25 mol % such as from 8 to 20 mol %, and more preferably approximately from 10 to 20 mol % such as from 10 to 18 mol %, or may be 6 mol % or greater, and more preferably 8 mol % or greater. In particular, when the isocyanate group concentration $C_{NCO}$ is in excess relative to the amino group concentration $C_{NH2}$ as described above, and the epoxy group concentration $C_{EP}$ is in the ratio described above, heat resistance can also be improved.

The ratio of the epoxy compound (C) per 100 parts by mass of the polyamide-based resin (A) may be, for example, approximately from 2.5 to 35 parts by mass, preferably approximately from 5 to 30 parts by mass such as from 7.5 to 25 parts by mass, and more preferably approximately from 10 to 20 parts by mass such as from 10 to 15 parts by mass, or may be approximately from 10 to 22 parts by mass. When the ratio of the epoxy compound (C) is too small, adhesion to the substrate such as a metal tends to decline. Meanwhile, when the ratio of the epoxy compound (C) is too large, the epoxy compound (C) remains, which seems to deteriorate the properties of the adhesive layer. Note that when an excessive amount of the epoxy compound (C) is used, reactivity with the molding resin (for example, a thermoplastic resin having a reactive group such as a carboxyl group or an amino group, with examples being a polyester resin and a polyamide-based resin) of the composite molded component can also be increased, and adhesion to the molding resin may also be improved. This may be because the adhesive layer functions as an active primer layer (active intermediate layer) even when the adhesive layer is cured.

Form of Curable Resin Composition

The curable resin composition of the present disclosure may be a liquid composition containing a solvent (solution composition or dispersion), or may have a powdered or granular form. The curable resin composition may usually be a mixture (powder mixture or particulate mixture) of a particulate (powdered) polyamide-based resin (A), a particulate blocked polyisocyanate (B), and a particulate epoxy compound (C). The curable resin composition may also be in the form of powder or granular material of the composition (composition solidified as one piece) in which the above components (the polyamide-based resin (A), blocked polyisocyanate (B), and epoxy compound (C)) are mixed.

The average particle size D50 of each one of the components (the polyamide-based resin (A), the blocked polyisocyanate (B), and the epoxy compound (C)) in the form of powder or granular material can be selected from, for example, a range of approximately from 1 to 300 μm, and typically may be approximately from 2 to 200 μm such as from 5 to 150 μm, preferably approximately from 10 to 100 μm such as from 15 to 80 μm, and more preferably approximately from 20 to 70 μm, as long as the uniformity of the coating film is not impaired.

Although the curable resin composition of the present disclosure may be a solution, when the curable resin composition is in a solid state (in the form of powder or granular material), the reaction among the components can be suppressed even when the amino group of the polyamide-based resin (A), the isocyanate group of the blocked polyisocyanate (B), and the epoxy group of the epoxy compound (C) are reactive with each other, resulting in a high storage stability. In addition, as described above, the curable resin composition of the present disclosure exhibits high adhesiveness or adhesion to a substrate (a substrate such as a metal). Therefore, the curable resin composition of the present disclosure is effective in improving corrosion resistance, durability, and the like by covering or coating a substrate (or component) with a coating film to protect the substrate.

The curable resin composition of the present disclosure may further contain a commonly used additive. Examples of the commonly used additive include, for example, a curing agent and a curing accelerator, in addition to the additives exemplified in the section regarding the poly amide-based resin (A). These additives can be used alone or in a combination of two or more. The ratio of the additive may be 10 mass % or less, such as approximately from 0.01 to 10 mass %, in the composition.

Composite Component and Production Method Thereof

The composite component can be produced by coating a surface of a substrate (or component) with the curable resin composition (adhesive resin composition) to form an adhesive layer (cured film or primer layer).

The type of the substrate is not particularly limited, and examples include: a metal, for example, iron or an iron alloy such as stainless steel, aluminum or an aluminum alloy, copper, and zinc; a ceramic, for example, pottery, porcelain, an oxide-based ceramic, a nitride-based ceramic, and a boride-based ceramic; a plastic, for example, a thermosetting or photocurable resin such as an epoxy-based resin, a phenol-based resin, and a polyimide-based resin, or a molded article of a heat-resistant thermoplastic resin (for example, an engineering plastic) such as a polyalkylene arylate resin, a polyarylate resin, an aromatic polyamide resin, a polycarbonate resin, a polyurethane resin, a thermoplastic polyimide resin, a polyphenylene ether resin, a polyether ketone resin, a polyether ether ketone resin, a polyphenylene sulfide resin, a polysulfone resin, a polyether sulfone resin, and a liquid crystal plastic; and wood. The substrate may be a composite substrate, for example: a substrate provided with a vapor-deposited film or the like; and a laminate substrate such as a laminate of, for example, the metal and the heat-resistant thermoplastic resin.

Preferred substrates are metals such as iron (such as steel plates), aluminum or alloys thereof (such as stainless steel). Depending on the type, these substrates may be subjected to surface treatment, for example, degreasing, polishing, electrochemical machining, and rough surface processing.

A commonly used application or coating method can be used for coating the substrate with the curable resin composition. Meanwhile, in the case of the curable resin composition in the form of powder, a powder coating method such as fluidized bed coating, which is a method of forming a coating film by immersing a substrate such as a heated metal in a powder or granular material in the fluid phase, electrostatic powder coating, and electrodeposition coating such as cation electrodeposition coating, can be used. Note that, in a thermal spraying method and the like in which coating is performed after a melting step, the reactive groups of each one of the components, along with melting and heating, may react with each other before forming a coating film. The electrostatic powder coating method may be, for example, an electrostatic spray method or an electrostatic fluidized bed coating method (a fluidized bed coating method in which powder is electrostatically attracted and adhered to a substrate to form a coating film). In order to form a uniform coating film (adhesive layer) on the surface of the substrate, an electrostatic powder coating method with little thermal history which can suppress the consumption of reactive groups in each of the components may be employed.

In order to react the polyamide-based resin (A), the blocked polyisocyanate (B), and the epoxy compound (C) with one another, the coating film may typically be formed by heating (or baking) to form a cured film. The heating temperature (or baking temperature) may be, for example, approximately from 150 to 250° C., preferably approximately from 170 to 230° C., more preferably approximately from 175 to 200° C., and even more preferably approximately from 180 to 190° C. Furthermore, the heating time (or baking time) may be, for example, approximately from 1 to 10 minutes, preferably approximately from 2 to 8 minutes, and more preferably approximately from 3 to 6 minutes.

The thickness of the coating film (adhesive layer or cured film) formed in this manner may be, for example, approximately from 1 to 500 μm, and may typically be approximately from 5 to 250 μm, preferably approximately from 10 to 200 μm, and more preferably approximately from 25 to 175 μm such as from 50 to 150 μm.

Such an adhesive layer not only exhibits high adhesion to a substrate or component, but also has high heat resistance and the like. Therefore, even when the thermoplastic resin is molded, no void at the interface between the substrate and the adhesive layer (or cured film) will be generated regardless of the molding conditions, which is useful for forming a uniform molded part with high adhesion and durability.

Composite Molded Component and Production Method Thereof

The composite molded component can be produced by molding or laminating a composition containing at least a thermoplastic resin on the adhesive layer of the composite component described above (a composite component having a substrate such as a metal substrate and the adhesive layer formed on a surface of the substrate).

The type of the thermoplastic resin is not particularly limited, and examples include: an olefin-based resin, such as a polyethylene-based resin, a polypropylene-based resin, a modified or copolymerized olefin-based resin, and a cyclic olefin-based resin; a styrene-based resin, for example, a styrene-based copolymer such as an acrylonitrile-styrene-based resin (AS resin), a high-impact polystyrene resin, and a rubber-reinforced styrene-based resin such as an acrylonitrile-styrene-butadiene resin (ABS resin); a (meth)acrylic resin; a vinyl acetate resin, or a derivative thereof, such as a polyvinyl alcohol resin and a polyvinyl acetal resin; a vinyl chloride resin; a polyester-based resin, for example, a polyalkylene arylate resin or a polyarylate resin such as a polyethylene terephthalate resin, a polybutylene terephthalate resin, and a polyethylene naphthalate resin; a polyamide-based resin; a polycarbonate resin; a polyurethane resin; a thermoplastic polyimide resin; a polyacetal resin; a polyether resin such as a polyphenylene ether resin, a polyether ketone resin, and a polyether ether ketone resin; a polyphenylene sulfide resin; a polysulfone resin such as a polysulfone resin and a polyethersulfone resin; a liquid crystal plastic such as a liquid crystal aromatic polyester resin; and a thermoplastic elastomer such as an olefin-based elastomer, a styrene-based elastomer, a polyester-based elastomer, a polyamide-based elastomer, a polyurethane-based elastomer, and a fluorine-based elastomer. A rubber (or unvulcanized rubber composition) such as an ethylene-propylene-diene rubber can also be used depending on the application. These thermoplastic resins can be used alone or in a combination of two or more.

The thermoplastic resin may have a functional group (reactive group) such as a hydroxyl group, a carboxyl group, an amino group, and a blocked isocyanate group. Note that it is possible to anticipate improved adhesion due to reaction with the molding resin or laminated sheet, which may be because the adhesive layer is active. In particular, when a reactive group such as an amino group, an isocyanate group, and/or an epoxy group (in particular, at least an isocyanate group) remains in the adhesive layer, the adhesive layer is active even after curing. Thus, the reactive group remaining in the adhesive layer may be reacted with the functional group (reactive group) of the thermoplastic resin to improve adhesion to the molding resin or laminated sheet.

In an embodiment of the present invention, it is also possible to mold a thermoplastic resin having a melting point or glass transition temperature that is less than or equal to the melting point of the polyamide-based resin of the curable resin composition. Meanwhile, when a thermoplastic resin having a melting point higher than that of the polyamide-based resin is molded, a resin molded part or laminated part can still be formed with high adhesion and durability without a void being generated at the interface between the substrate such as a metal and the adhesive layer. Therefore, in order to form a resin molded part or laminated part having high heat resistance and durability, the thermoplastic resin may have a melting point or glass transition temperature that is greater than or equal to the melting point of the polyamide-based resin. Depending on the type of thermoplastic resin, the melting point or glass transition temperature of such a thermoplastic resin may be, for example, approximately from 100 to 350° C. such as from 160 to 330° C., preferably approximately from 170 to 300° C. such as from 200 to 280° C., and may typically be approximately from 180 to 270° C. such as from 190 to 260° C., preferably approximately from 200 to 250° C. such as from 200 to 240° C. In particular, the melting point of the thermoplastic resin (especially in the case of a polyamide-based resin) may be, for example, approximately from 200 to 250° C., preferably approximately from 210 to 240° C., more preferably approximately from 215 to 230° C., and particularly approximately from 220 to 230° C.

Preferred thermoplastic resins may be, for example, an aromatic polyester resin, such as a polyalkylene arylate resin or a polyarylate resin which may have a hydroxyl group and/or a carboxyl group at the terminal, or may be a polyamide-based resin which may have an amino group and/or a carboxyl group, and in particular, may be a polyamide-based resin having an amino group. Examples of the polyamide-based resin include: polyamide 46; polyamide 6; polyamide 66; an alicyclic polyamide containing the alicyclic diamine component and/or the alicyclic dicarboxylic acid component as a polymerization component; polyamide MXD-6, which is a polyamide resin containing at least xylylene diamine and adipic acid as reaction components; and a non-crystalline polyamide, such as a polyamide resin containing at least terephthalic acid and trimethylhexamethylenediamine as reaction components. Note that the amino group concentration and the carboxyl group concentration of the polyamide-based resin are the same as those described above. Of these, an aliphatic polyamide is preferable, and polyamide 6 is particularly preferable.

The thermoplastic resin may optionally contain various additives, for example: a stabilizer, such as a heat-resistant stabilizer, a weather-resistant stabilizer, an antioxidant, and a UV absorber; a colorant; a magnetic material, for example, a paramagnetic material such as ferrite and a ferromagnetic material such as magnet; a filler; a reinforcing agent; a plasticizer; a lubricant; a flame retardant; an antistatic agent; and a silane coupling agent. Additives can be used alone or in a combination of two or more. The reinforcing agent may be a granular reinforcing agent, such as calcium carbonate, barium sulfate, titanium oxide, silica, alumina, mica, clay, talc, and carbon black, or may be a fibrous reinforcing agent, such as an organic fiber such as rayon, nylon, vinylon, and aramid, and an inorganic fiber such as glass fiber, carbon fiber, metal fiber, and whisker. Preferred reinforcing agents are fibrous reinforcing agents such as glass fiber. The content of the reinforcing agent per 100 parts by mass of the thermoplastic resin may be, for example, approximately from 5 to 50 parts by mass, and preferably approximately from 10 to 40 parts by mass.

The composition containing the thermoplastic resin may be molded (overmolded or molded), or laminated in the form of a sheet, on the adhesive layer. Molding of the thermoplastic resin composition can be performed in accordance with a commonly used insert molding method. A composite molded component in which a molded part of a thermoplastic resin composition is formed in a laminated form on the adhesive layer of the composite component can be obtained by melting and molding the thermoplastic resin composition using injection molding or the like. For example, a thermoplastic resin composition, a thermoplastic resin composition containing the magnetic material, or a thermoplastic resin composition containing a reinforcing agent such as glass fiber may be melted, kneaded, and injection-molded on the adhesive layer to prepare a composite molded article in which a resin layer, a magnetic layer, or a reinforcing layer is formed on a substrate such as a metal.

In addition, the thermoplastic resin composition may be directly laminated in the form of a molten sheet on the adhesive layer after being subjected to melt extrusion molding in the form of a sheet. Alternatively, a thermoplastic resin composition containing a reinforcing agent such as glass fiber may be molded into the form of a sheet or a tape (for example, an oriented sheet or tape (uni-directional material) in which the fibrous reinforcing agent is oriented in a predetermined direction), and the molded sheet or tape may be laminated (laminated after being heated) directly on the adhesive layer. Note that by laminating an oriented sheet or tape, even if the thickness of the substrate such as a metal is small, it is possible to produce a composite molded article having excellent mechanical properties.

In an embodiment of the present invention, even if the heating temperature for molding or laminating the thermoplastic resin is relatively low, it is possible to firmly and stably adhere a composition containing the thermoplastic resin to the substrate. The heating temperature (for example, the cylinder temperature of injection molding) may be 280°

C. or lower, for example, approximately from 230 to 280° C., preferably approximately from 240 to 275° C., more preferably approximately from 250 to 270° C., and even more preferably approximately from 260 to 270° C.

EXAMPLES

Hereinafter, the present invention is described in greater detail based on examples, but the present invention is not limited to these examples. The following materials were used in the following examples and comparative examples.
Substrate A steel plate (stainless steel plate SUS430, available from Nippon Testpanel Co., Ltd) was used after being degreased.
Polyamide-Based Resin PA12: Polyamide 12 (available from Daicel-Evonik Ltd., having a water absorption of 0.25%, an amino group concentration of 145 mmol/kg, a carboxyl group concentration of 4 mmol/kg, a number average molecular weight of 13423, and an average particle size of 47 μm when in the form of powder)

coPA: Copolyamide 6/66/12 (available from Daicel-Evonik Ltd., having a water absorption of 1.5%, an amino group concentration of 187 mmol/kg, a carboxyl group concentration of 1.5 mmol/kg, a number average molecular weight of 10610, and an average particle size of 42 μm when in the form of powder)

Note that the water absorption was measured using the water absorption test specified in ASTM D570. Furthermore, the amino group concentration and the carboxyl group concentration were measured by the neutralization titration method mentioned above. In addition, the average particle size was measured using a particle size distribution measurement device adopting a laser diffraction/scattering method, in which the polyamide resin was frozen and pulverized.
Blocked Isocyanate b-NCO: Blocked isocyanate ("VESTAGON BF 1540", an uretdione polyisocyanate adduct, available from Evonik, having an isocyanate group concentration of 3600 mmol/kg, a glass transition temperature of 84° C. or lower, and is in the form of powder)

Note that the isocyanate group concentration was calculated from the isocyanate content.
Epoxy Compound epoxy: Bisphenol A epoxy resin (available from Mitsubishi Chemical Corporation, having an epoxy group concentration of 500 mmol/kg, a hydroxyl group concentration of 3600 mmol/kg, and is in the form of powder)

The epoxy group concentration was calculated from the epoxy equivalent weight, and the hydroxyl group concentration was calculated based on the number of repeating units obtained from the molecular weight of the epoxy resin.
Molding Resin PA6: "CM1011GF30", available from Toray Industries, Inc., having an equilibrium water absorption of 2.5% at 23° C. and 50% Rh (The Toray Method/Japan Engineering Plastics Technical Committee, 12th edition, April 2015).

Examples and reference examples A composite component was prepared by mixing polyamide resin powder, blocked polyisocyanate powder, and epoxy resin powder at the ratios shown in Table 1 to prepare a powder mixture, electrostatically coating the powder mixture on a degreased substrate to a thickness of approximately 100 μm, and placing the resulting article in an oven and heating at 185° C. for 5 minutes to form a coating film.

A composite molded article was prepared by injection-molding (insert-molding) the molding resin PA6 on the coating film of the composite component at a cylinder temperature of 280° C. or 270° C. using an injection molding machine ("ET40V", available from Toyo Machinery & Metal Co., Ltd.) to form a resin layer having a thickness of 3 mm.
Adhesive Strength The adhesive strength of the resin layer with respect to the substrate of the obtained composite molded article was measured at a temperature of adhesion test from 23 to 80° C. according to ISO 19095-2 Type B.

The results are shown in Table 1.

TABLE 1

| | Composition (mass ratio) | | | | At cylinder temperature of 280° Temperature of adhesion test | | | At cylinder temperature of 270° Temperature of adhesion test | | |
|---|---|---|---|---|---|---|---|---|---|---|
| | PA12 | coPA | b-NCO | epoxy | 23° C. | 60° C. | 80° C. | 23° C. | 60° C. | 80° C. |
| Reference Example 1 | 80 | 0 | 10 | 10 | 25 | 23 | 19 | 15 | 10 | 8 |
| Reference Example 2 | 56 | 24 | 10 | 10 | 15 | 13 | 11 | 10 | 8 | 6 |
| Example 1 | 48 | 32 | 10 | 10 | 25 | 20 | 14 | 23 | 18 | 13 |
| Example 2 | 40 | 40 | 10 | 10 | 24 | 20 | 18 | 24 | 19 | 16 |
| Example 3 | 32 | 48 | 10 | 10 | 24 | 21 | 20 | 25 | 23 | 18 |
| Reference Example 3 | 0 | 80 | 10 | 10 | 15 | 9 | 4 | 22 | 10 | 6 |

As revealed by the results shown in Table 1, the resin compositions of the Examples exhibited high adhesive strength even when the temperature of adhesive test was increased while the cylinder temperature was at 270° C. or 280° C.

INDUSTRIAL APPLICABILITY

The curable resin composition of the present disclosure is suitable to be used as an adhesive resin composition for producing a composite molded article (hybrid component) in which a substrate such as a metal and a resin are composited (hybridized). The composite molded article obtained according to an embodiment of the present invention can be used in applications where high durability is required, for example: vehicles such as automobiles, trains, airplanes or aircraft, and ships, or structural components or underbody components (suspension, wheels, brakes, etc.) of vehicles (transportation devices or transportation means); and parts or components (structural components, etc.) of, for example, a rail structure. Specifically, the composite molded component can be applied to a vehicle structural component (an automobile part or component, etc.) such as a front end (a bumper).

The invention claimed is:

1. A curable resin composition comprising:
a polyamide-based resin (A) having an amino group;
a blocked polyisocyanate (B); and
an epoxy compound (C), wherein
the polyamide-based resin (A) contains a polyamide-based resin (A1) having a melting point of 170° C. or higher and a polyamide-based resin (A2) having a melting point of 150° C. or lower;
a mass ratio of the polyamide-based resin (A1) to the polyamide-based resin (A2), in the form of the former/the latter, is from 60/40 to 40/60;
a ratio of the isocyanate group of the blocked polyisocyanate (B) per 1 mol of the amino group of the polyamide-based resin (A) is from 1.5 to 5 mol; and
a ratio of the epoxy group of the epoxy compound (C) per 1 mol of the amino group of the polyamide-based resin (A) is from 0.1 to 0.8 mol.

2. The curable resin composition according to claim 1, wherein the polyamide-based resin (A) is particulate.

3. The curable resin composition according to claim 1, wherein the curable resin composition is a particulate mixture.

4. The curable resin composition according to claim 1, wherein an amino group concentration of the polyamide-based resin (A1) and an amino group concentration of the polyamide-based resin (A2) are each 80 mmol/kg or greater.

5. The curable resin composition according to claim 1, wherein
the blocked polyisocyanate (B) has a glass transition temperature from 60 to 110° C., a melting point from 70 to 130° C., and a dissociation temperature from 120 to 200° C.; and
the epoxy compound (C) contains a bisphenol-type epoxy resin having a softening temperature of 75° C. or higher.

6. The curable resin composition according to claim 1, wherein
the isocyanate group of the blocked polyisocyanate (B) is in excess from 15 to 450 mmol/kg with respect to the amino group of the polyamide-based resin (A); and
a concentration of the epoxy group is from 3 to 35 mol % with respect to a total number of moles of the amino group, isocyanate group, and epoxy group.

7. The curable resin composition according to claim 1, wherein
a total number of moles of the isocyanate group of the blocked polyisocyanate (B) is from 1.3 to 50 times a total number of moles of the amino group of the polyamide-based resin (A); and
the blocked polyisocyanate (B) is contained in a ratio from 5 to 30 parts by mass per 100 parts by mass of the polyamide-based resin (A) while the epoxy compound (C) is contained in a ratio from 5 to 30 parts by mass per 100 parts by mass of the polyamide-based resin (A).

8. A composite component in which an adhesive layer of the curable resin composition according to claim 1 is formed on a surface of a substrate.

9. A composite molded component wherein a composition containing at least a thermoplastic resin is molded or laminated on the adhesive layer of the composite component according to claim 8.

10. The composite molded component according to claim 9, wherein
the substrate is a metal substrate; and the thermoplastic resin contains a polyamide-based resin having a melting point higher than a melting point of the polyamide-based resin (A).

11. A method of producing a composite molded component, comprising: molding or laminating a composition containing at least a thermoplastic resin on the adhesive layer of the composite component according to claim 8.

12. A method of producing a composite component, comprising: coating a surface of a substrate with the curable resin composition according to claim 1 and forming an adhesive layer.

* * * * *